US012299289B2

(12) United States Patent
Ionin et al.

(10) Patent No.: US 12,299,289 B2
(45) Date of Patent: May 13, 2025

(54) QoS OPTIMIZATION BY USING DATA TRACKING MODULE

(71) Applicant: Western Digital Technologies, Inc., San Jose, CA (US)

(72) Inventors: Michael Ionin, Rehovot (IL); Alexander Bazarsky, Holon (IL); Judah Gamliel Hahn, Ofra (IL)

(73) Assignee: Sandisk Technologies, Inc., Milpitas, CA (US)

( * ) Notice: Subject to any disclaimer, the term of this patent is extended or adjusted under 35 U.S.C. 154(b) by 14 days.

(21) Appl. No.: 18/218,837

(22) Filed: Jul. 6, 2023

(65) Prior Publication Data

US 2024/0168644 A1    May 23, 2024

Related U.S. Application Data

(60) Provisional application No. 63/427,162, filed on Nov. 22, 2022.

(51) Int. Cl.
*G06F 3/06*       (2006.01)

(52) U.S. Cl.
CPC .......... *G06F 3/0613* (2013.01); *G06F 3/0656* (2013.01); *G06F 3/0673* (2013.01)

(58) Field of Classification Search
CPC .... G06F 3/0613; G06F 3/0656; G06F 3/0673; G06F 3/061; G06F 3/0679; G06F 3/06
See application file for complete search history.

(56) References Cited

U.S. PATENT DOCUMENTS

| | | | |
|---|---|---|---|
| 8,645,617 B2 | 2/2014 | Shaeffer et al. | |
| 10,175,891 B1* | 1/2019 | Malwankar | G06F 3/0611 |
| 10,228,869 B1* | 3/2019 | Nakibly | G06F 3/065 |
| 10,642,727 B1 | 5/2020 | Volpe et al. | |
| 10,671,291 B2 | 6/2020 | Lesartre et al. | |
| 11,003,580 B1* | 5/2021 | Goss | G06F 12/0246 |
| 11,586,385 B1* | 2/2023 | Lercari | G06F 1/30 |
| 2004/0098552 A1 | 5/2004 | Kadi | |
| 2014/0143476 A1 | 5/2014 | Sela et al. | |
| 2016/0011790 A1* | 1/2016 | Rostoker | G06F 12/0868 |
| | | | 711/103 |
| 2016/0350221 A1 | 12/2016 | Shaikh et al. | |
| 2020/0133839 A1* | 4/2020 | Sidhpura | G06F 12/0246 |
| 2020/0241797 A1 | 7/2020 | Kanno | |

FOREIGN PATENT DOCUMENTS

WO    2010077414 A1    7/2010

\* cited by examiner

*Primary Examiner* — Khoa D Doan
(74) *Attorney, Agent, or Firm* — Patterson + Sheridan, LLP

(57) ABSTRACT

A data storage device includes a memory device and a controller coupled to the memory device. When data received by the controller, from a host device or from a non-volatile memory of the data storage device, the controller maintains table tracking the location of the data. The table may include a current location of the data in a volatile memory of the controller or the data storage device as well as the current location of the data a latch of the non-volatile memory. The table may further associate the location with a logical block address, such that when the host device requests the data not yet programmed to the non-volatile memory or data that is part of a data relocation operation, the controller may utilize the table to locate the relevant data and provide the data to the host device.

20 Claims, 9 Drawing Sheets

QoS OPTIMIZATION BY USING DATA TRACKING MODULE

CROSS-REFERENCE TO RELATED APPLICATIONS

This application claims benefit of U.S. Provisional Patent Application Ser. No. 63/427,162, filed Nov. 22, 2022, which is herein incorporated by reference.

BACKGROUND OF THE DISCLOSURE

Field of the Disclosure

Embodiments of the present disclosure generally relate to data storage devices, such as solid state drives (SSDs), and, more specifically, optimizing quality of service of read command execution.

Description of the Related Art

Data storage devices, such as SSDs, have certain quality of service (QoS) requirements for which latency/probability profiles the data storage devices should target. In order to improve QoS, performance of the data storage device may be improved for average scenarios as well as for a distribution of different scenarios and command combinations. During data storage device operation, latency for reading data recently programmed (e.g., hot data or overlap data) or in the process of being programmed may be high. In other words, because the data may be unaccessible or locked, the latency to read the data may be high. For example, data being programmed to a non-volatile memory of the data storage device may be transferred between several volatile memories before being programmed to the non-volatile memory. While the data is being transferred between the volatile memories, the location of the data may not be tracked in real time. Therefore, read commands for the data being transferred between the volatile memories may be stalled until the data is programmed to the non-volatile memory.

Furthermore, programming the data may be delayed for various reasons, such as scheduler priority, waiting for prior writes to end, waiting for blocks erasure, etc. Additionally, during relocation operations, such as garbage collection, data is read from the non-volatile memory to the controller, in order to be written to another block (e.g., single level cell memory to triple level cell memory or from triple level cell memory to triple level cell memory). When the data is being relocated, the data may be unavailable to be read from the non-volatile memory until the data relocation operation is completed. Thus, the latency associated with read commands may be increased due to the unavailability of data to be read.

Therefore, there is a need in the art for to reduce read delay in a data storage device.

SUMMARY OF THE DISCLOSURE

The present disclosure generally relates to data storage devices, such as SSDs, and, more specifically, optimizing quality of service of read command execution. A data storage device includes a memory device and a controller coupled to the memory device. When data received by the controller, from a host device or from a non-volatile memory of the data storage device, the controller maintains an active table tracking the location of the data. The active table may include a current location of the data in a volatile memory of the controller or the data storage device as well as the current location of the data a latch of the non-volatile memory. The active table may further associate the location with a logical block address, such that when the host device requests the data not yet programmed to the non-volatile memory or data that is part of a data relocation operation, the controller may utilize the active table to locate the relevant data and provide the data to the host device.

In one embodiment, a data storage device includes a memory device and a controller coupled to the memory device. The controller is configured to receive a read request to read data from the memory device, determine that the data is located in a pipeline of the data storage device, where the controller is further configured to track a storage location of the data when the data exists at least in a storage location other than the memory device, and read the data from the storage location in the pipeline of the data storage device in response to the read request, where the pipeline includes a plurality of storage locations that are temporary storage locations.

In another embodiment, a data storage device includes a memory device and a controller coupled to the memory device. The controller includes a data tracking module configured to track a storage location of data when the data exists at least in a storage location other than the memory device and cause the controller to read the data from the storage location when the data exists at least in a storage location other than the memory device in response to receiving a read request to read the data from the memory device.

In another embodiment, a data storage device includes memory means and a controller coupled to the memory means. The controller is configured to receive a read request to read data from the memory means, determine that the data at least exists in a storage location other than the memory means, and read the data from the storage location other than the memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as SSDs, and, more specifically, optimizing quality of service of read command execution. A data storage device includes a memory device and a controller coupled to the memory device. When data received by the controller, from a host device or from a non-volatile memory of the data storage device, the controller maintains an active table tracking the location of the data. The active table may include a current location of the data in a volatile memory of the controller or the data storage device as well as the current location of the data a latch of the non-volatile memory. The active table may further associate the location with a logical block address, such that when the host device requests the data not yet programmed to the non-volatile memory or data that is part of a data relocation operation, the controller may utilize the active table to locate the relevant data and provide the data to the host device.

Figure 1:
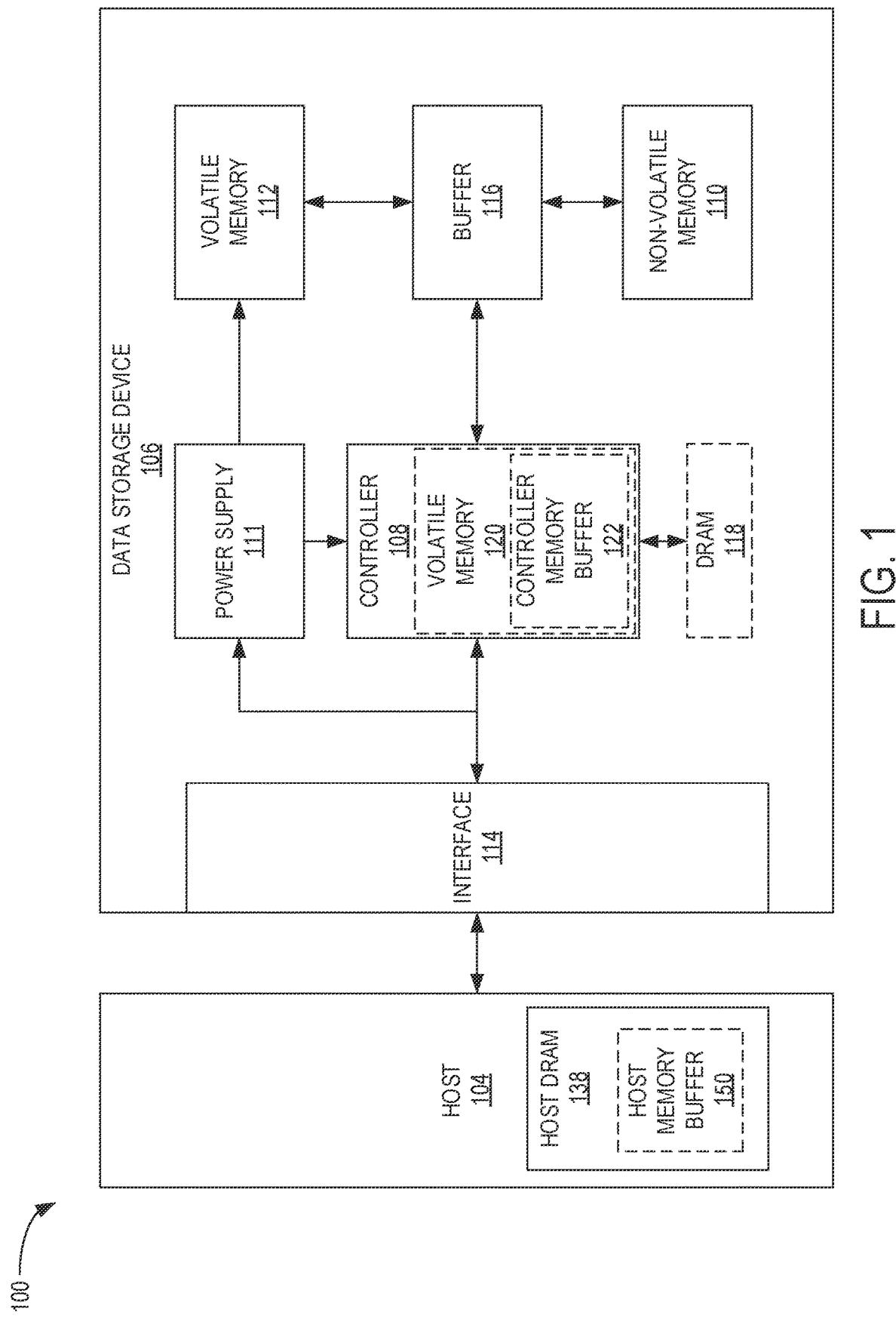
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
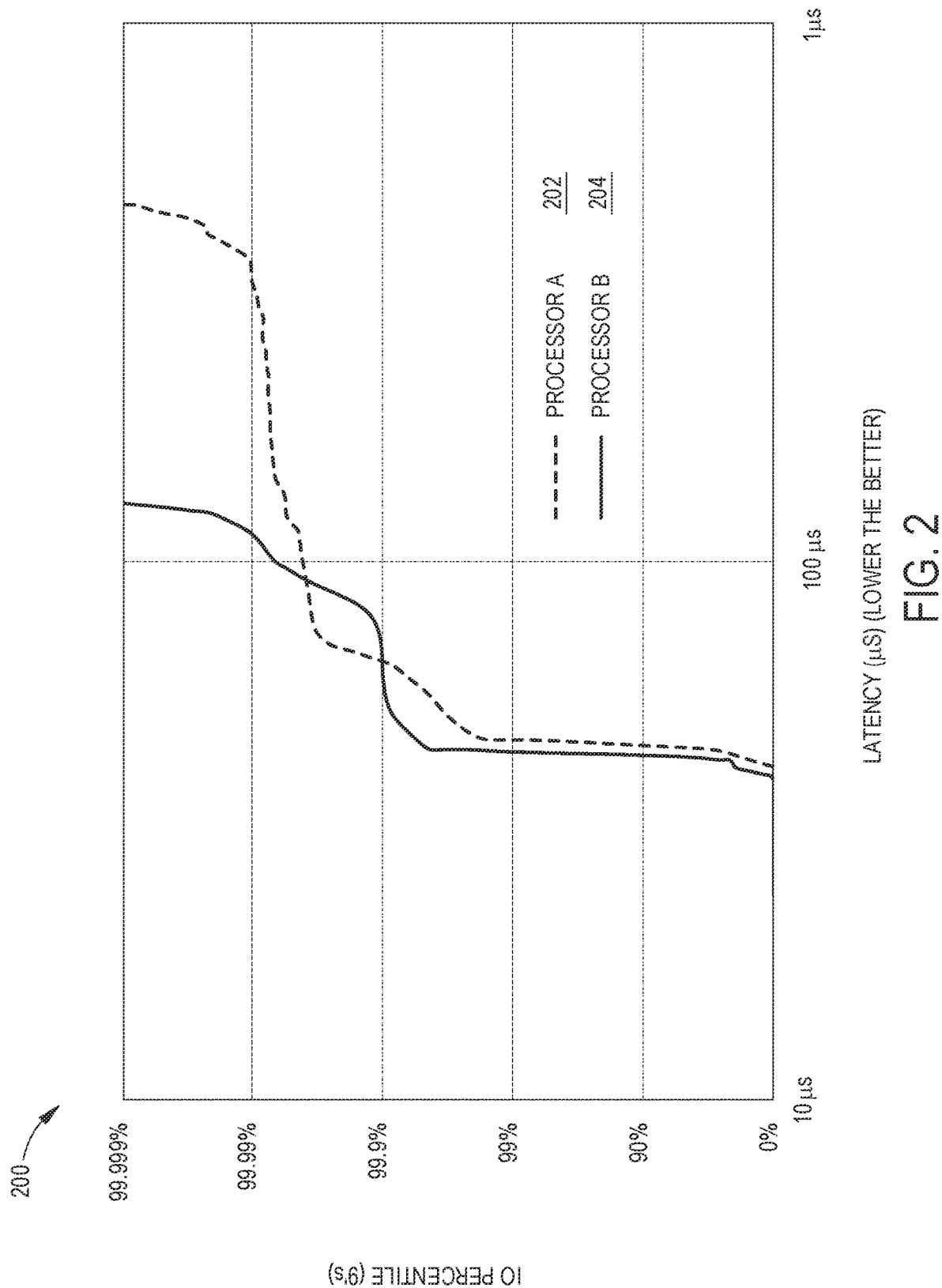
FIG. 2 is an exemplary graph illustrating quality of service of a first processor and a second processor, according to certain embodiments.

FIG. 2 is a graph 200 illustrating QoS of a first processor 202 and a second processor 204, according to certain embodiments. The x-axis of the graph 200 represents read latency, where lower latency values correspond with higher performance. The y-axis of the graph 200 represents a percentage of total input/output (IO) operations (IOPS) that have been completed. As shown on the graph 200, the second processor 204 has a better (i.e., lower) read latency than the first processor 202 at higher percentage of total IOPS. QoS requirements for data storage devices, such as the data storage device 106 of FIG. 1, may resemble graph 200, where a maximum allowed read latency is shown for each percentage. When a host device, such as the host device 104 of FIG. 1, sends a read command for data being programmed to an NVM, such as the NVM 110 of FIG. 1, or sends a read command for data that has just been programmed to the NVM 110, the read command execution may be delayed. Thus, the delay in completing the read command may cause the read latency of the data storage device 106 to increase, which may cause the QoS of the data storage device 106 to decrease.

Figure 3:
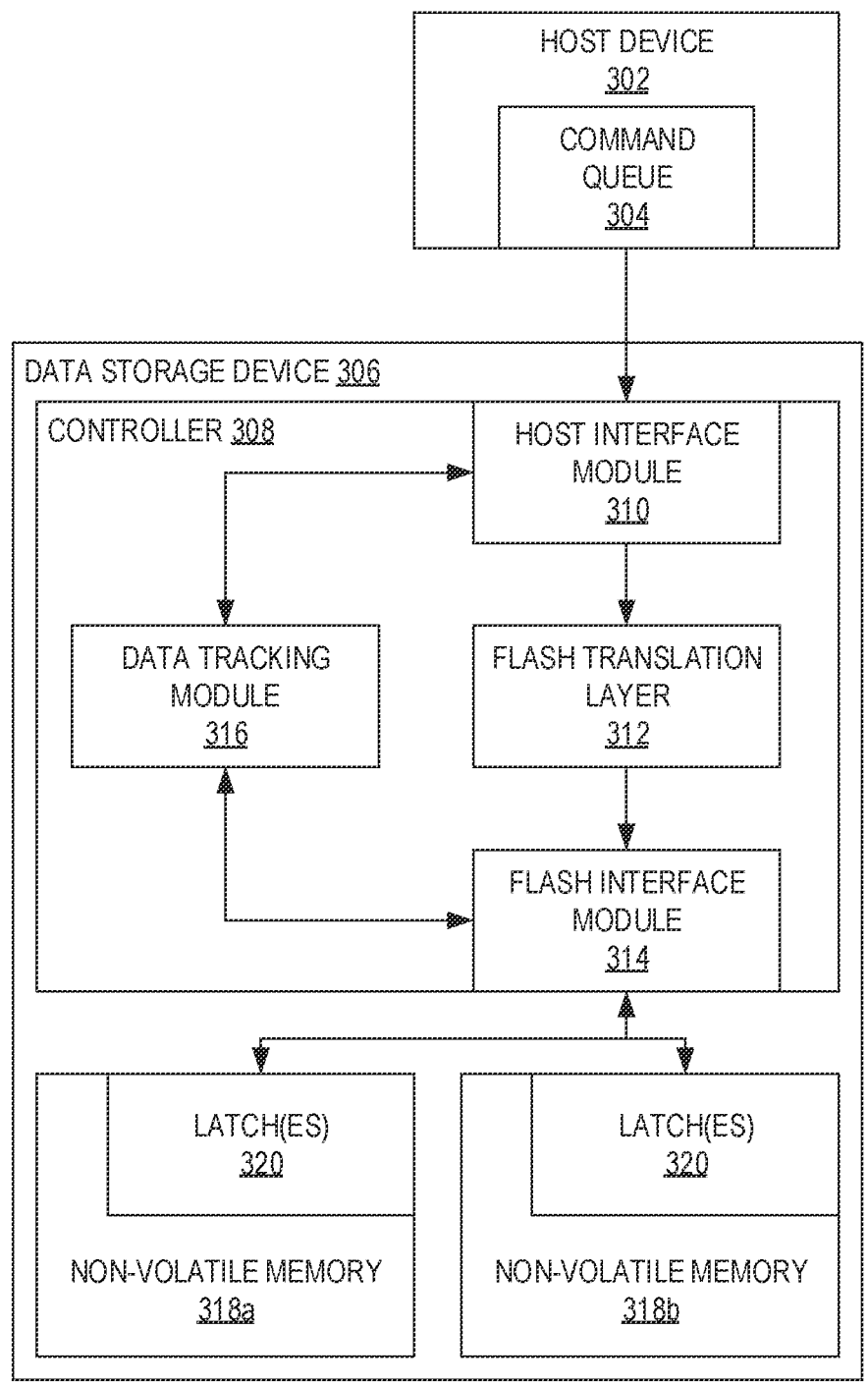
FIG. 3 is a schematic block diagram illustrating a storage system in which a controller of a data storage device may track a location of data when the data is not yet programmed to a non-volatile memory or is being moved as part of a data relocation operation, according to certain embodiments.

FIG. 3 is a schematic block diagram illustrating a storage system 300 in which a controller 308 of a data storage device 306 may track a location of data when the data is not yet programmed to NVMs 318a, 318b or is being moved as part of a data relocation operation, according to certain embodiments. The storage system 300 includes a host device 302 having a command queue 304, where the host device 302 is coupled to the data storage device 306. The data storage device 306 includes the controller 308, a first NVM 318a, and a second NVM 318b. It is to be understood that the data storage device may include additional components not shown for simplification purposes.

The controller 308 may fetch commands and data from the command queue 304 or the host device 302 may send commands and data from the command queue 304 to the controller 308. The controller 308 includes a host interface module (HIM) 310, a flash translation layer (FTL) 312, a flash interface module (FIM) 314, and a data tracking module 316. Commands and data are passed from the command queue 304 to the HIM 310, where the HIM 310 sends the commands and data through the FTL 312 to the FIM 314. The FTL 312 may be responsible for generating logical block address (LBA) to physical block address (PBA) (L2P) mapping tables and pointers associated with the data. The FIM 314 may be responsible for accessing the first NVM 318a and the second NVM 318b to program data to and read data from the respective first NVM 318a and second NVM 318b.

The data tracking module 316 of the controller 308 may keep track of when data is received by the controller 308, but not yet programmed to either the first NVM 318a or the second NVM 318b, or exists in a latch (i.e., latches 320) of the first NVM 318a or the second NVM 318b. For example, when data is being moved as part of a data relocation operation, such as garbage collection, the data may be temporarily moved to a latch 320 of the first NVM 318a or to a volatile memory of the controller 308. When the data is temporarily moved, the data tracking module 316 may generate an entry in a table, which may be stored in a volatile memory of the controller, such as the second volatile memory 120 of FIG. 1, corresponding to the location of the data and a corresponding LBA. Because the data may be moved from a first volatile memory to a second volatile memory, the data tracking module 316 may further be configured to update the entry associated with the data with the updated location of the data. When the data is finally programmed back to the first NVM 318a, for example, the data tracking module 316 may erase the entry from the table.

Because the data tracking module 316 keeps track of data not yet programmed to the first NVM 318a or the second NVM 318b or being moved from a first location to a second location of the first NVM 318a or the second NVM 318b as part of a data relocation operation, the controller 308 may be able to provide the data to the host device in response to a read command. For example, if the host device 302 sends a read command to read LBA X, the controller 308 utilizes the data tracking module 316 to determine whether the corresponding data is in the first NVM 318a, the second NVM 318b, in the latches 320, or in a volatile memory of a plurality of volatile memories of the data storage device 306. If the data is in the latches 320 or one of the plurality of volatile memories of the data storage device 306, then the controller 308 is configured to read the data from the latches 320 or the relevant volatile memory of the plurality of volatile memories. Otherwise, the data is read from a corresponding location in the first NVM 318a or the second NVM 318b.

Figure 4:
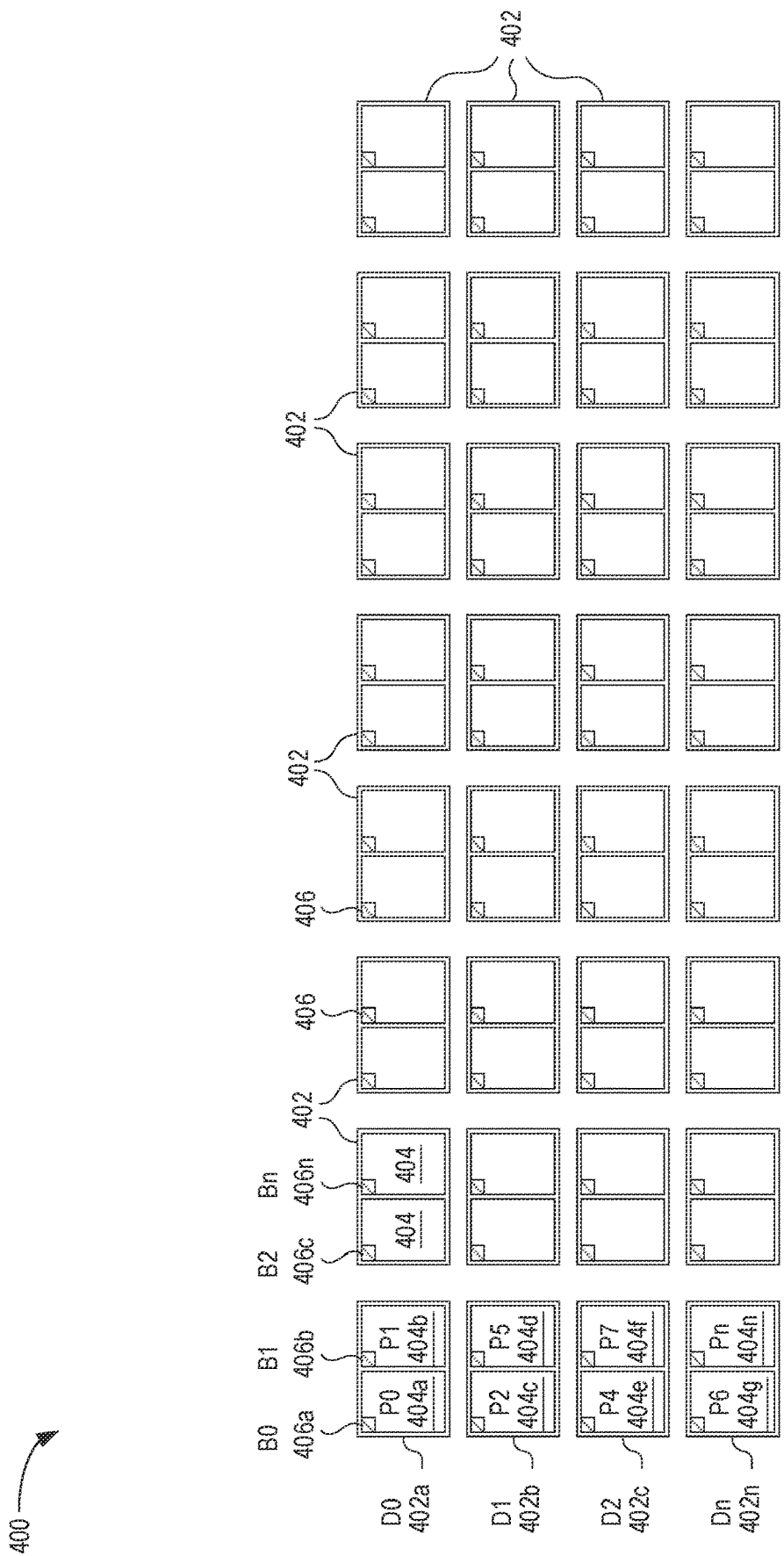
FIG. 4 is an illustration of a memory device, according to certain embodiments.

FIG. 4 is an illustration of a memory device 400, which may be the NVM 110 of FIG. 1, according to certain embodiments. The memory device 400 includes a plurality of dies 402a-402n, collectively referred to as dies 402, where each die of the plurality of dies 402a-402n includes a first plane 404a and a second plane 404b, collectively referred to as planes 404. Each of the planes 404 includes a plurality of blocks 406a-406n, collectively referred to as block 406. While 32 dies 502 are shown in the memory device 400, any number of dies may be included. Furthermore, the dies 402 may be split into a plurality of sets of dies, where each of the sets of dies has one or more distinct dies of the plurality of dies 402a-402n. For example, a first die 402a may be in a first set of dies and a second set of dies may include a second die 402b and a third die 402c. Each of the sets of dies may be associated with a flash channel of a controller, such as the controller 308 of FIG. 3, where the controller includes the FIM 314. The FIM 314 may be configured to read data from and write data to the memory device 400, where commands are sent via a respective flash channel to program data to a respective die of the memory device 400 or read data from a respective die of the memory device 400.

Figure 5A:
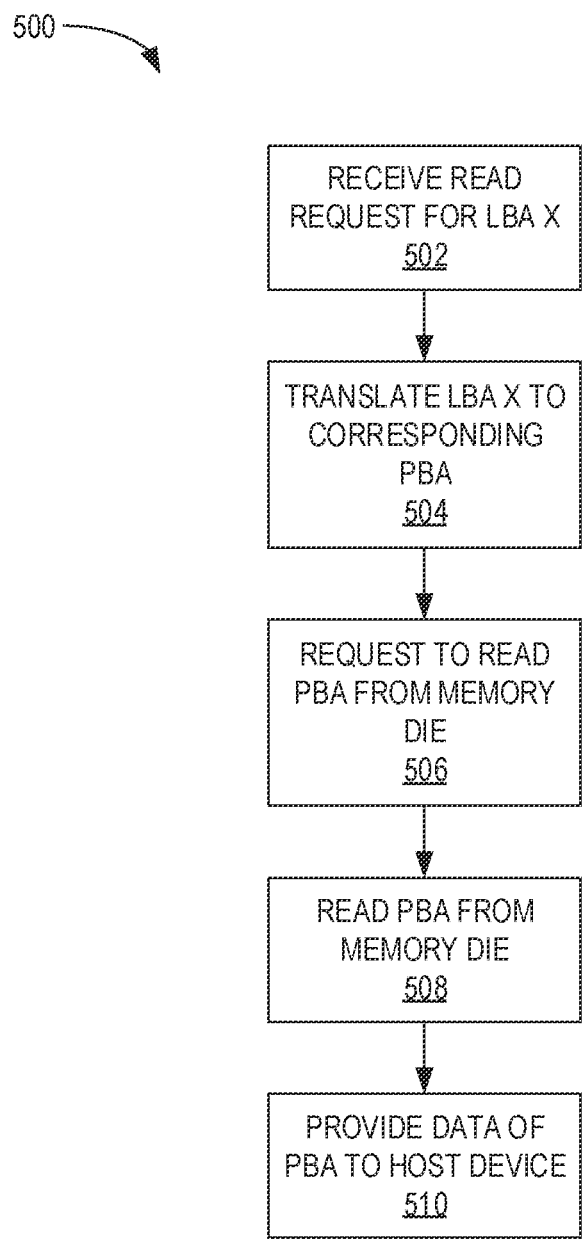
FIG. 5A is a flow diagram illustrating a method of handling read commands, according to certain embodiments.

FIG. 5A is a flow diagram illustrating a method 500 of handling read commands, according to certain embodiments. Method 500 may be implemented by a controller, such as the controller 108 of FIG. 1 or the controller 308 of FIG. 3. For exemplary purposes, aspects of the storage system 100 of FIG. 1 and the storage system 300 of FIG. 3 may be referenced herein.

At block 502, the controller 108 receives a read request for LBA X from the host device 104. At block 504, the FTL 312 translates the requested LBA X to the corresponding PBA. At block 506, the controller 108 requests to read the PBA from the corresponding memory die of the NVM 110. If the data is not yet available, such as the data may still be being programmed to the NVM 110 or is being moved from a first location to a second location of the NVM 110 as part of a data relocation operation, then method 500 waits until the data is available. When the data is available, the controller 108 reads the relevant PBA from the memory die of the NVM 110 at block 508. At block 510, the PBA read from the NVM 110 is provided to the host device 104 in response to the read request for LBA X.

Figure 5B:
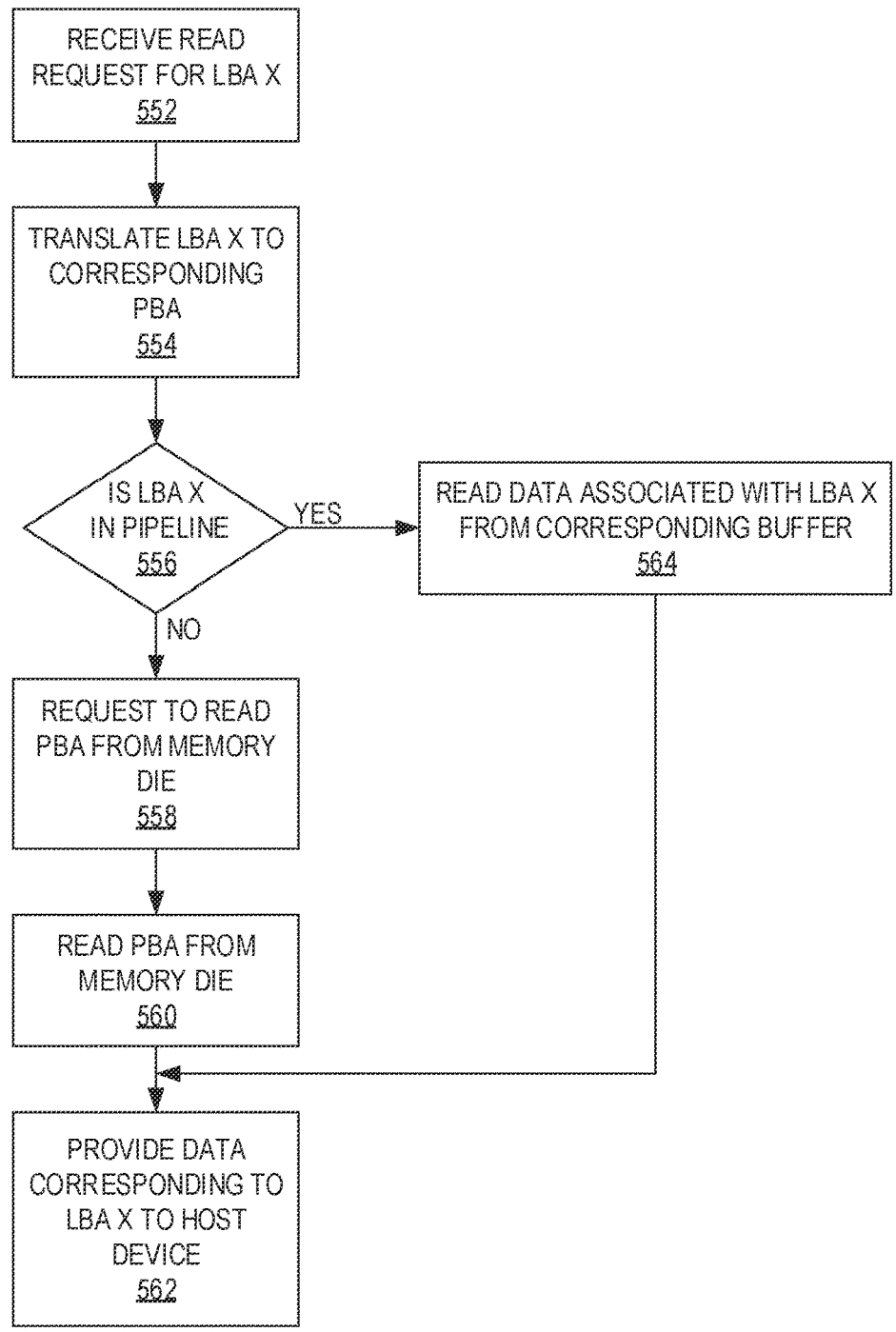
FIG. 5B is a flow diagram illustrating a method of handling read commands using a data tracking module, according to certain embodiments.

FIG. 5B is a flow diagram illustrating a method 550 of handling read commands using a data tracking module, according to certain embodiments. Method 550 may be implemented by a controller, such as the controller 108 of FIG. 1 or the controller 308 of FIG. 3. For exemplary purposes, aspects of the storage system 300 of FIG. 3 may be referenced herein.

At block 552, the controller 308 receives a read request for LBA X from the host device 302. At block 554, the FTL 312 translates the requested LBA X to the corresponding PBA. At block 556, the controller 308 utilizes the data tracking module 316 to determine whether the data corresponding to the PBA (or the LBA) is in the pipeline (i.e., not yet programmed to the NVMs 318a, 318b or in one of the latches 320 of the NVMs 318a, 318b).

If the LBA X is not in the pipeline at block 556, then the controller 308 requests to read the PBA from the corresponding memory die of the NVMs 318a, 318b at block 558. At block 560, the controller 308 reads the relevant PBA from the memory die of the NVMs 318a, 318b. At block 562, the data corresponding to the LBA X is provided to the host device 302 in response to the read request for LBA X. However, if the LBA X is in the pipeline at block 556, then the controller 308 reads the data from the corresponding volatile memory of the plurality of volatile memories or the corresponding latch of the latches 320 at block 564. At block 562, the data corresponding to the LBA X is provided to the host device 302 in response to the read request for LBA X. Thus, rather than waiting for the data to be committed to the NVMs 318a, 318b, such as in method 500 of FIG. 5A, the data may be read from one of the volatile memories or the latches 320 and provided to the host device 302.

FIGS. 6A-6E are exemplary illustrations of data being transferred from a host device, such as the host device 302 of FIG. 3, to a non-volatile memory 610, according to certain embodiments. For exemplary purposes, aspects of the storage system 300 of FIG. 3 may be referenced herein. In FIGS. 6A-6E, volatile memories may be referred to as TRAM 602 and BRAM 604 and the latches may be referred to as XDL 606, ADL 608a, BDL 608b, and CDL 608c, where ADL 608a, BDL 608b, and CDL 608c are latches for TLC memory.

Figure 6A:
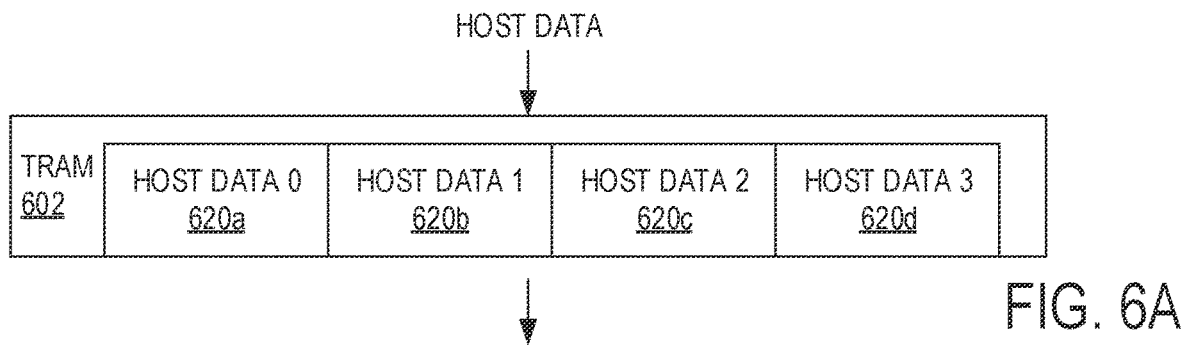
FIGS. 6A-6E are exemplary illustrations of data being transferred from a host device to a non-volatile memory, according to certain embodiments.
Figure 6B:
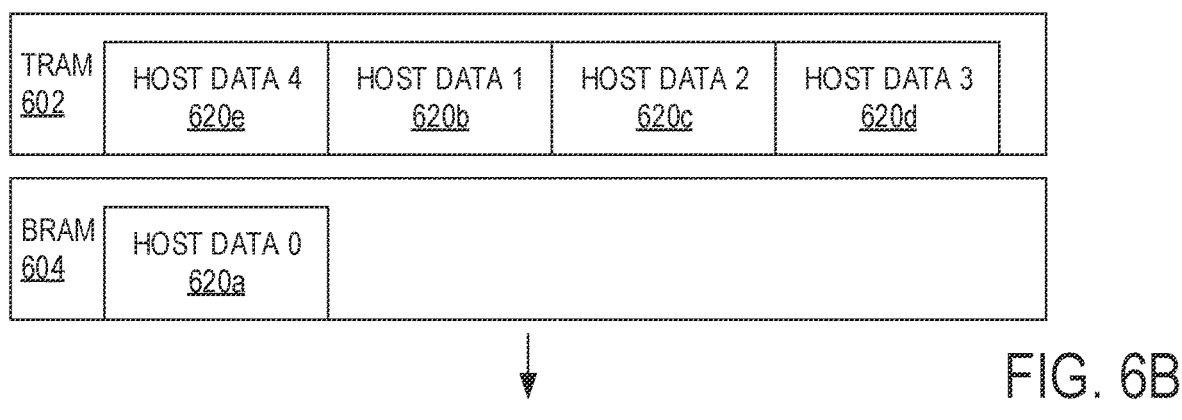
Figure 6C:
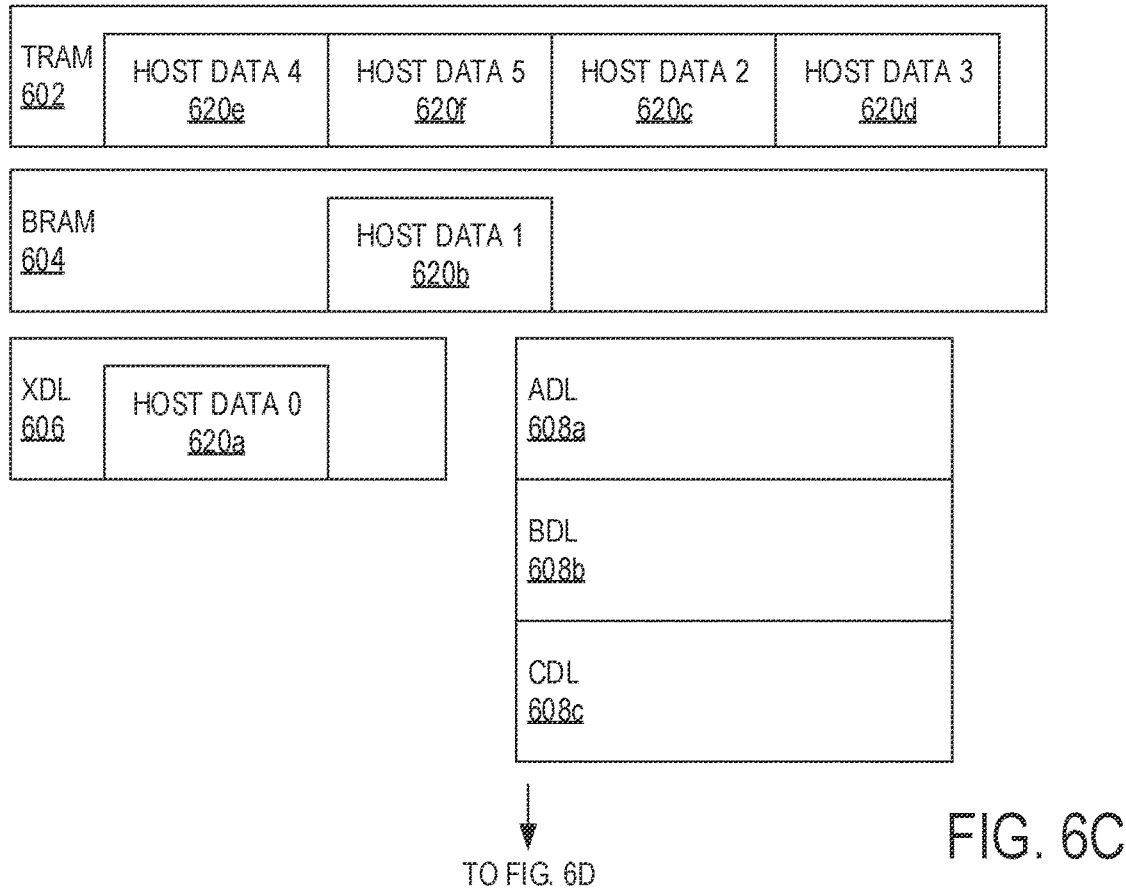

Referring to FIG. 6A, host data is copied to the TRAM 602 from the HIM 310. TRAM 602 includes host data 0 620a, host data 1 620b, host data 2 620c, and host data 3 620d. Referring to FIG. 6B, the controller 308 receives a new indication of a new data buffer (i.e., BRAM 604) and sends it to the data path of the FTL 312. The data is scrambled and copied to the BRAM 604 which may be located in the FIM 314. After host data 0 620a is copied from the TRAM 602 to the BRAM 604, the host data 0 620a is erased from the TRAM 602, or in other words, the corresponding buffer storing host data 0 620a in the TRAM 602 is released. Thus, new host data (host data 4 620e) may be copied to the TRAM 602 in the corresponding buffer location. Referring to FIG. 6C, the data in the BRAM 604 is copied to the XDL 606, which may be a latch of the latches 320 of the NVM 610. For example, host data 0 620a is copied from BRAM 604 to the XDL 606. The corresponding buffer in the BRAM 604 where the host data 0 620a is stored is released when the host data 620 is copied to the XDL 606.

Figure 6D:
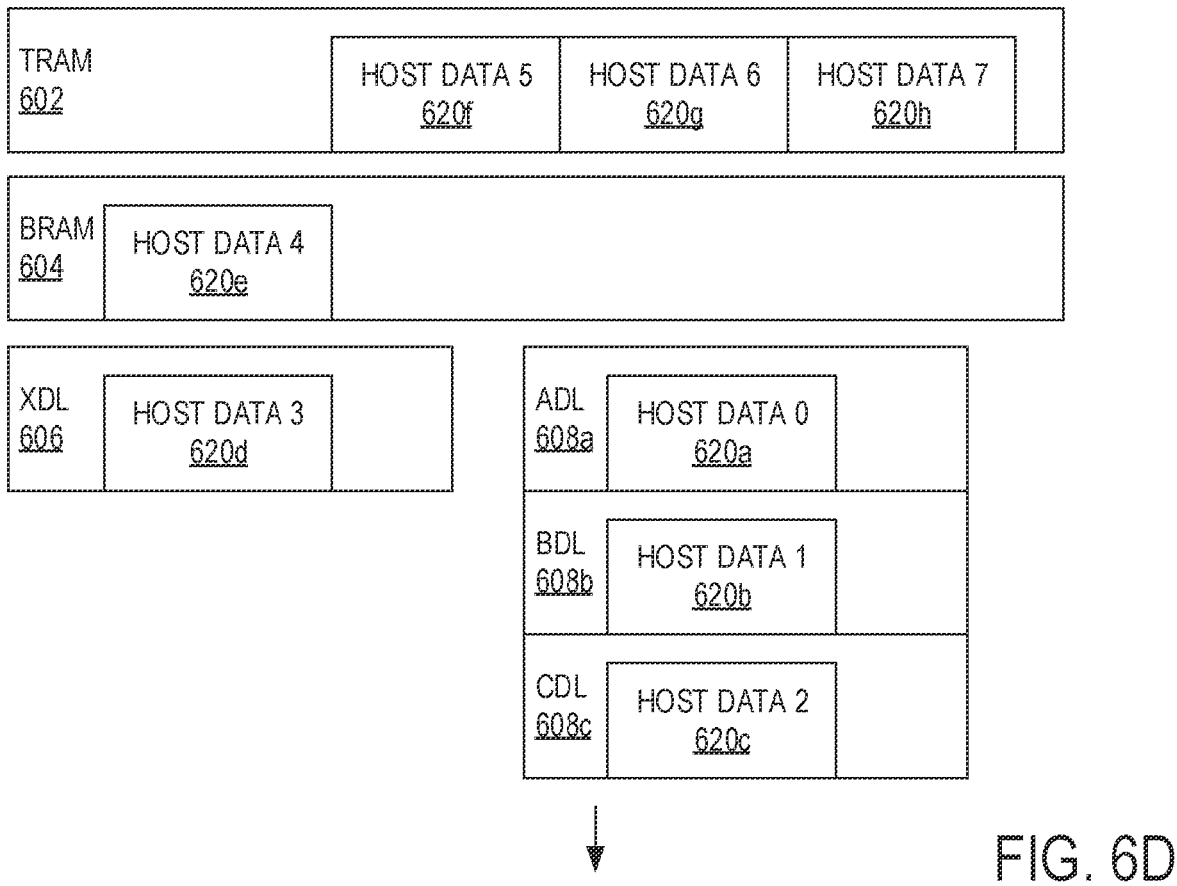
Figure 6E:
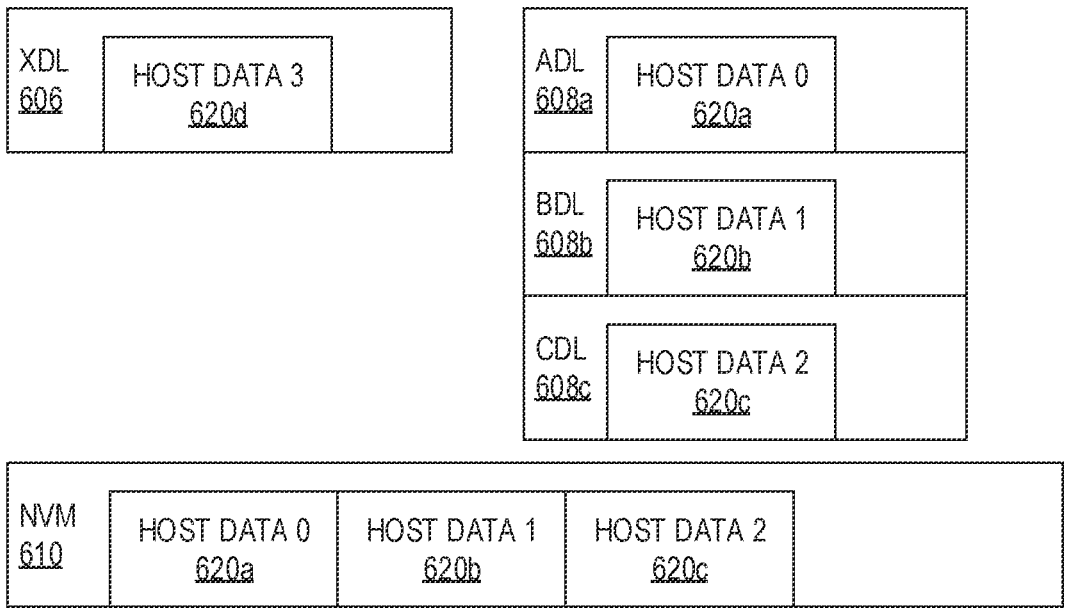

Referring to FIG. 6D, the ADL 608a, the BDL 608b, and the CDL 608c latches each corresponds to a lower wordline, middle wordline, and an upper wordline of a TLC memory cell, respectively. For example, host data 0 620a stored in ADL 608a will be programmed to a lower wordline of a TLC memory cell of the NVM 610. In cases of SLC memory writes, the data may be programmed directly from the XDL 606 to the NVM 610. Referring to FIG. 6E, the data (i.e., host data 0 620a, host data 1 620b, host data 2 620c) in the ADL 608a, the BDL 608b, and the CDL 608c are programmed to the NVM 610. Each time data is moved into the TRAM 602, or from the TRAM 602 to the BRAM 604, from the BRAM 604 to the XDL 606, or from the XDL 606 to the ADL 608a, the BDL 608b, or the CDL 608c, the data tracking module 316 creates a new entry in a table when an entry corresponding to the data is not previously recorded in the table or updates an existing entry with an updated location of the data in the pipeline. When the data is finally programmed to the NVM 610, the data tracking module 316 may erase or delete the entry corresponding to the data.

Figure 7:
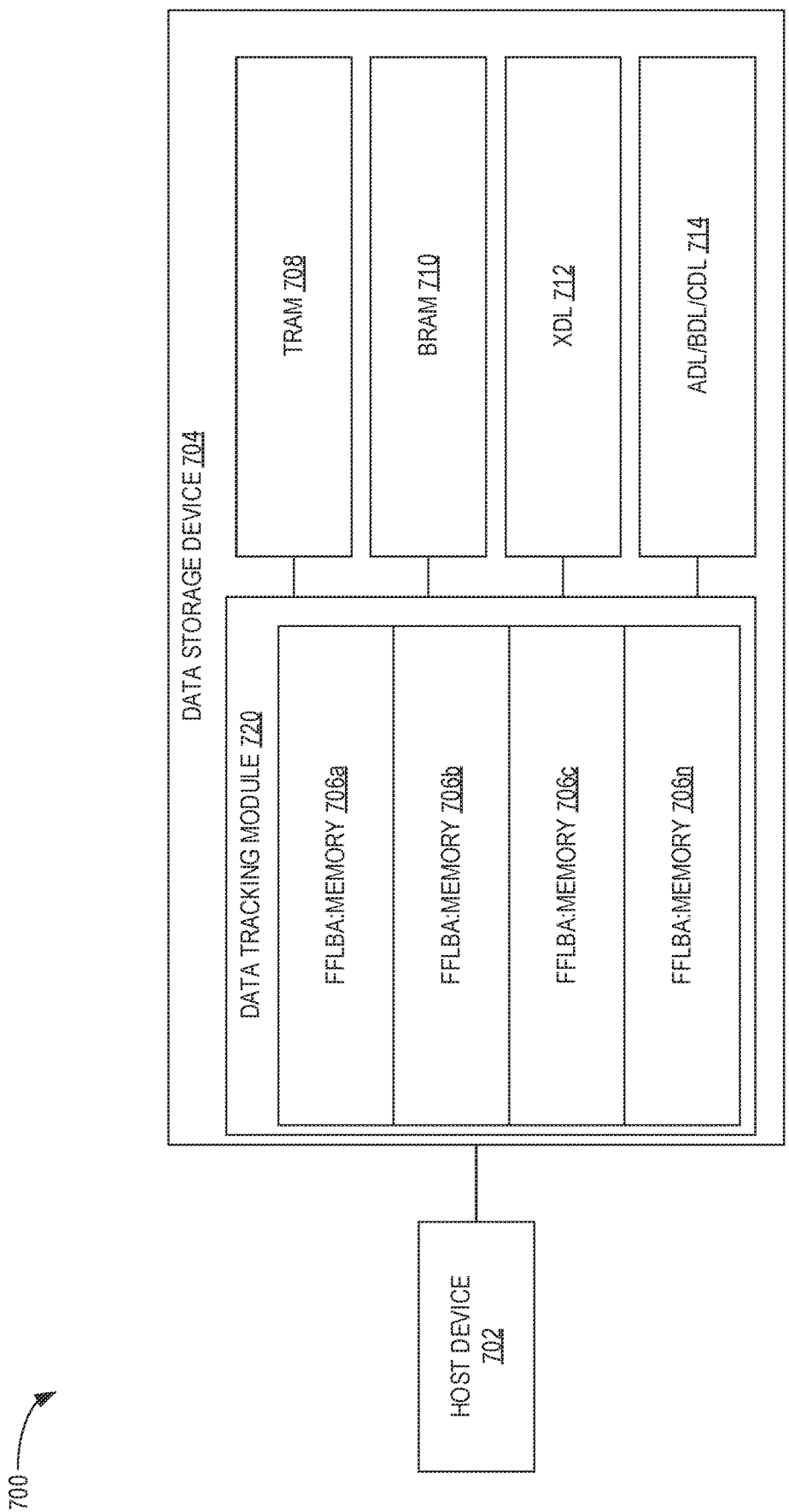
FIG. 7 is a schematic block diagram illustrating a storage system in which a data storage device tracks a location of data, using a data tracking module, within a volatile memory of a plurality of volatile memories or a latch of the data storage device, according to certain embodiments.

FIG. 7 is a schematic block diagram illustrating a storage system 700 in which a data storage device 704 tracks a location of data, using a data tracking module 720, within a volatile memory of a plurality of volatile memories, such as a TRAM 708 or a BRAM 710, or a latch of a plurality of latches, such as XDL 712 or ADL/BDL/CDL 714, of the data storage device 704, according to certain embodiments. The data tracking module 720 may get an indication from the plurality of volatile memories 708, 710 or the plurality of latches 712, 714 for new buffers being copied in. Prior to releasing the buffer (i.e., the data of the buffer has been copied to a different buffer or the NVM), the data tracking module 720 may determine whether there is an active ongoing read to the buffer using a table storing LBA: memory mappings (e.g., FFLBA:memory 706a-706n). If there is no active ongoing read to the buffer, then the buffer may be released. However, if there is an active ongoing read to the buffer, then the data tracking module 720 lock the buffer, such that the buffer cannot be released until the buffer is unlocked. Thus, by using the data tracking module, the read latency of the data storage device may be reduced as well as waiting for the data to be programmed to the NVM may be avoided.

By tracking a location of data not yet programmed to the non-volatile memory or being moved from a first location of the non-volatile memory to a second location of the non-volatile memory as part of a data relocation operation, the quality of service of performing read commands may be improved.

In one embodiment, a data storage device includes a memory device and a controller coupled to the memory device. The controller is configured to receive a read request to read data from the memory device, determine that the data is located in a pipeline of the data storage device, where the controller is further configured to track a storage location of the data when the data exists at least in a storage location other than the memory device, and read the data from the storage location in the pipeline of the data storage device in response to the read request, where the pipeline includes a plurality of storage locations that are temporary storage locations.

The plurality of storage locations comprises latches of the memory devices and random access memories. The storage location is stored in a table stored in random access memory (RAM). The data is being relocated from a first location of the memory device to a second location of the memory device. The controller is further configured to determine that the data is not located in the pipeline of the data storage device and read the data from the memory device. The controller is further configured to receive an indication to release the storage location of the plurality of storage locations, determine that there are no more pending commands associated with the storage location, and release the storage location. The determining further includes searching a table having one or more entries for a logical block address (LBA) range associated with the read request, where each entry of the one or more entries corresponds with an LBA range of the memory device corresponding to data located in the pipeline of the data storage device. The controller is further configured to generate an entry in the table corresponding to the data being received by the controller from either a host device or the memory device. An entry of the table is removed when the data corresponding to the entry is removed from the pipeline of the data storage device.

In another embodiment, a data storage device includes a memory device and a controller coupled to the memory device. The controller includes a data tracking module configured to track a storage location of data when the data exists at least in a storage location other than the memory device and cause the controller to read the data from the storage location when the data exists at least in a storage location other than the memory device in response to receiving a read request to read the data from the memory device.

The data exists at least in a storage location other than the memory device comprises data being moved from a first location of the memory device to a second location of the memory device. The data exists at least in a storage location other than the memory device comprises data received from a host device. The storage location is either in a buffer of TRAM, a buffer of BRAM, or a memory device transfer latch. The data tracking module is further configured to update the storage location when the data is moved from the buffer of the TRAM to the buffer of the BRAM and update the storage location when the data is moved from the buffer of the BRAM to the memory device transfer latch. The controller is configured to lock a memory associated with the storage location. The locking causes the memory to not be released. The data being read from the storage location has not yet been programmed to the memory device. The tracking includes recording one or more logical block addresses (LBAs) associated with data that is not programmed to the memory device and determining that a received LBA of the read request matches a recorded LBA associated with the data that exists at least in a storage location other than the memory device.

In another embodiment, a data storage device includes memory means and a controller coupled to the memory means. The controller is configured to receive a read request to read data from the memory means, determine that the data exists at least in a storage location other than the memory means, and read the data from the storage location other than the memory means. The storage location is random access memory. The storage location is a latch associated with the memory means.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
receive a read request to read data from the memory device;
determine that the data is located in a pipeline of the data storage device, wherein the controller is further configured to track a storage location of the data when the data exists at least in a storage location other than the memory device; wherein the data is being relocated from a first location of the memory device to a second location of the memory device; and
read the data from the storage location in the pipeline of the data storage device in response to the read request, wherein the pipeline comprises a plurality of storage locations that are temporary storage locations.

2. The data storage device of claim 1, wherein the plurality of storage locations comprises latches of the memory devices and random access memories.

3. The data storage device of claim 1, wherein the storage location is stored in a table stored in random access memory (RAM).

4. The data storage device of claim 1, wherein the controller is further configured to:
determine that the data is not located in the pipeline of the data storage device; and
read the data from the memory device.

5. The data storage device of claim 1, wherein the controller is further configured to:
receive an indication to release the storage location of the plurality of storage locations;
determine that there are no more pending commands associated with the storage location; and
release the storage location.

6. The data storage device of claim 1, wherein the determining further comprises:
searching a table having one or more entries for a logical block address (LBA) range associated with the read request, wherein each entry of the one or more entries corresponds with an LBA range of the memory device corresponding to data located in the pipeline of the data storage device.

7. The data storage device of claim 6, wherein the controller is further configured to:
generate an entry in the table corresponding to the data being received by the controller from either:
a host device; or
the memory device.

8. The data storage device of claim 6, wherein an entry of the table is removed when the data corresponding to the entry is removed from the pipeline of the data storage device.

9. A data storage device, comprising:
a memory device; and
a controller coupled to the memory device, wherein the controller comprises:
a data tracking module configured to:
track a storage location of data when the data exists at least in a storage location other than the memory device, wherein the data exists at least in a storage location other than the memory device comprises data being moved from a first location of the memory device to a second location of the memory device; and
cause the controller to read the data from the storage location when the data exists at least in a storage location other than the memory device in response to receiving a read request to read the data from the memory device.

10. The data storage device of claim 9, wherein the data exists at least in a storage location other than the memory device comprises data received from a host device.

11. The data storage device of claim 9, wherein the storage location is either in:
a buffer of TRAM;
a buffer of BRAM; or
a memory device transfer latch.

12. The data storage device of claim 11, wherein the data tracking module is further configured to:
update the storage location when the data is moved from the buffer of the TRAM to the buffer of the BRAM; and update the storage location when the data is moved from the buffer of the BRAM to the memory device transfer latch.

13. The data storage device of claim 9, wherein the controller is configured to lock a memory associated with the storage location, and wherein locking causes the memory to not be released.

14. The data storage device of claim 9, wherein the data being read from the storage location has not yet been programmed to the memory device.

15. The data storage device of claim 9, wherein the tracking comprises:
   recording one or more logical block addresses (LBAs) associated with data that is not programmed to the memory device; and
   determining that a received LBA of the read request matches a recorded LBA associated with the data that exists at least in a storage location other than the memory device.

16. A data storage device, comprising:
   memory means; and
   a controller coupled to the memory means, wherein the controller is configured to:
      receive a read request to read data from the memory means, wherein the data is being relocated from a first location of the memory means to a second location of the memory means;
      determine that the data exists at least in a storage location other than the memory means; and
      read the data from the storage location other than the memory means.

17. The data storage device of claim 16, wherein the storage location is random access memory.

18. The data storage device of claim 16, wherein the storage location is a latch associated with the memory means.

19. The data storage device of claim 16, wherein the controller comprises a data tracking module.

20. The data storage device of claim 16, wherein data tracking module is coupled to both a host interface module and a flash interface module.

* * * * *